(12) United States Patent
Tsujimoto

(10) Patent No.: US 8,465,049 B2
(45) Date of Patent: Jun. 18, 2013

(54) AIRBAG AND AIRBAG DEVICE

(75) Inventor: Kei Tsujimoto, Tokyo (JP)

(73) Assignee: Takata Corporation, Tokyo (JP)

( * ) Notice: Subject to any disclaimer, the term of this patent is extended or adjusted under 35 U.S.C. 154(b) by 179 days.

(21) Appl. No.: 12/962,808

(22) Filed: Dec. 8, 2010

(65) Prior Publication Data

US 2011/0148078 A1 Jun. 23, 2011

(30) Foreign Application Priority Data

Dec. 23, 2009 (JP) ................................. 2009-291604

(51) Int. Cl.
*B60R 21/233* (2006.01)

(52) U.S. Cl.
USPC ............................ 280/729; 280/732; 280/742

(58) Field of Classification Search
USPC .................. 280/729, 732, 742, 736
See application file for complete search history.

(56) References Cited

U.S. PATENT DOCUMENTS

| | | | |
|---|---|---|---|
| 5,913,535 A * | 6/1999 | Taguchi et al. | 280/729 |
| 5,951,038 A * | 9/1999 | Taguchi et al. | 280/729 |
| 5,957,486 A * | 9/1999 | Taguchi et al. | 280/729 |
| 6,247,727 B1 * | 6/2001 | Hamada et al. | 280/743.2 |
| 6,382,662 B1 * | 5/2002 | Igawa | 280/729 |
| 7,040,655 B2 * | 5/2006 | Igawa et al. | 280/739 |
| 7,195,279 B2 * | 3/2007 | Rose et al. | 280/740 |
| 7,922,191 B2 * | 4/2011 | Choi | 280/729 |
| 8,100,432 B2 * | 1/2012 | ÅGren | 280/729 |
| 8,215,665 B2 * | 7/2012 | Ohara et al. | 280/729 |
| 2003/0151233 A1 * | 8/2003 | Varcus | 280/729 |

FOREIGN PATENT DOCUMENTS

| | | |
|---|---|---|
| JP | S50-108140 U | 9/1975 |
| JP | H03-052265 U | 5/1991 |
| JP | 03281460 A * | 12/1991 |
| JP | H03-281460 A | 12/1991 |
| JP | H05-262195 A | 10/1993 |
| JP | H10-044914 A | 2/1998 |
| JP | H10-071904 A | 3/1998 |
| JP | H10-071920 A | 3/1998 |
| JP | H10-203280 A | 8/1998 |
| JP | H10-203281 A | 8/1998 |
| JP | H11-115667 A | 4/1999 |

(Continued)

OTHER PUBLICATIONS

Extended European search report issued in counterpart European Application No. 10 01 6056.3 dated Apr. 29, 2011 (6 pages).

*Primary Examiner* — Paul N Dickson
*Assistant Examiner* — Timothy Wilhelm
(74) *Attorney, Agent, or Firm* — Fitch, Even, Tabin & Flannery, LLP

(57) ABSTRACT

An airbag and an airbag device can support itself without using the reaction force from a front glass and cost reduction and commonality of components are achieved. An airbag of the present invention is normally accommodated in an instrument panel in a folded state and is inflated and deployed between a front glass and an occupant by gas being supplied thereto in an emergency. The airbag has rectification means disposed therein that controls the flow of the gas. The rectification means has a first opening through which gas is supplied such that part of the airbag on the occupant side is pressed against the instrument panel, a second opening through which gas is supplied such that the airbag is lifted upward, and a third opening through which the gas is supplied to a base end portion of the airbag on the front glass side.

7 Claims, 5 Drawing Sheets

FOREIGN PATENT DOCUMENTS

| | | |
|---|---|---|
| JP | H11-139239 A | 5/1999 |
| JP | H11-139240 A | 5/1999 |
| JP | H11-170955 A | 6/1999 |
| JP | 2001-163143 A | 6/2001 |
| JP | 2001-233152 A | 8/2001 |
| JP | 2002-036996 A | 2/2002 |
| JP | 2003-320921 A | 11/2003 |
| JP | 2004-268656 A | 9/2004 |
| JP | 2009-154778 A | 7/2009 |

* cited by examiner

FIG. 3
FIG. 3(A)
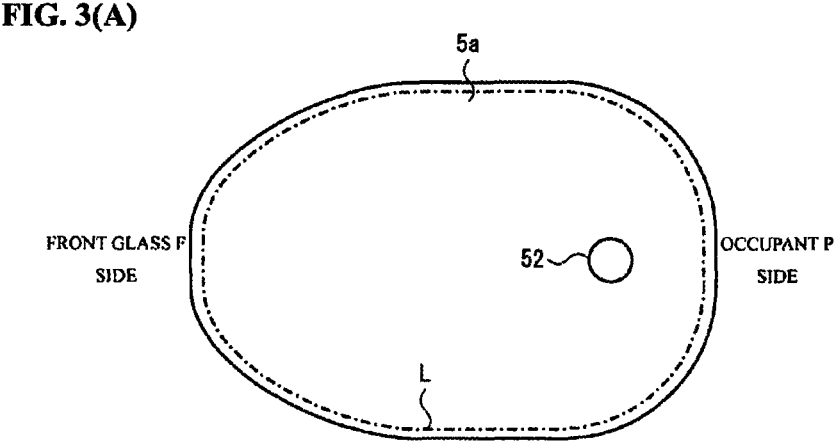
FIG. 3(B)
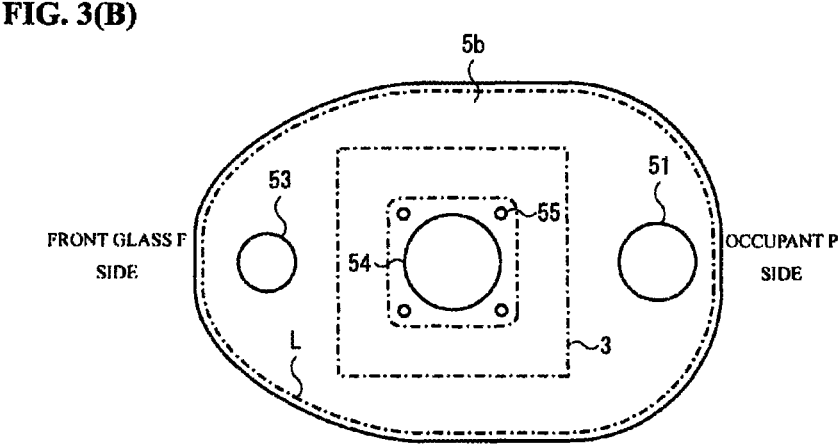
FIG. 3(C)
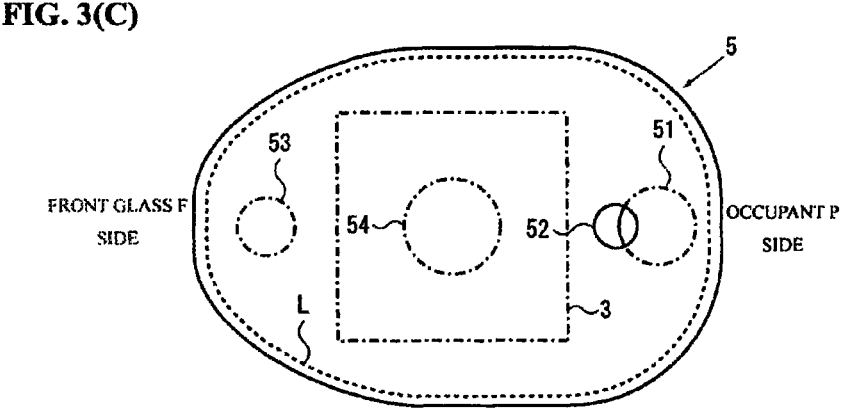

FIG. 4
FIG. 4(A)
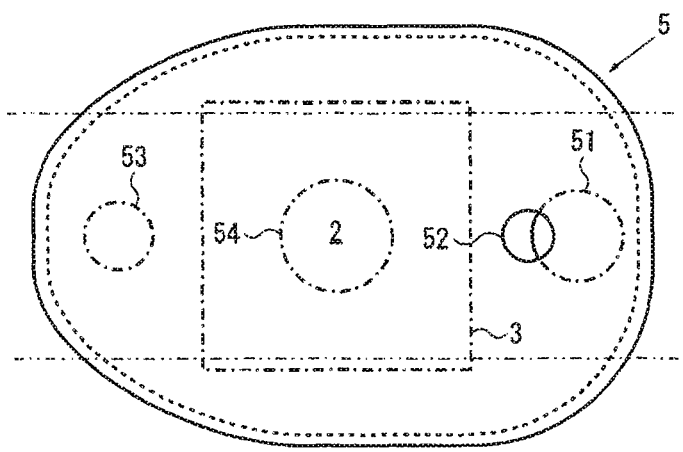
FIG. 4(B)
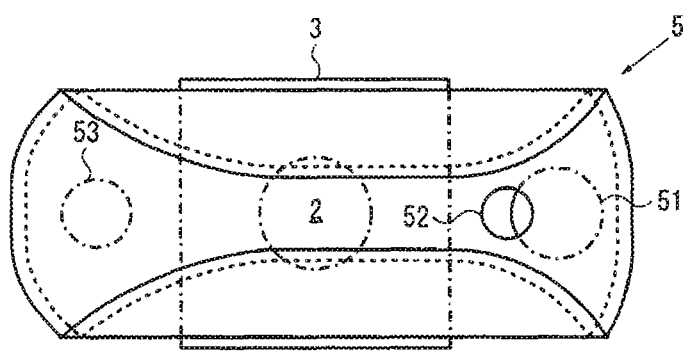
FIG. 4(C)
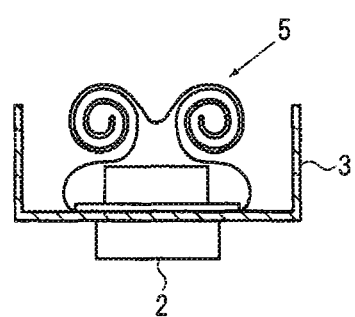

FIG. 5
FIG. 5(A)
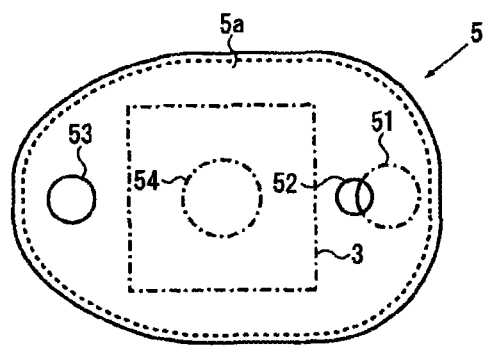
FIG. 5(B)
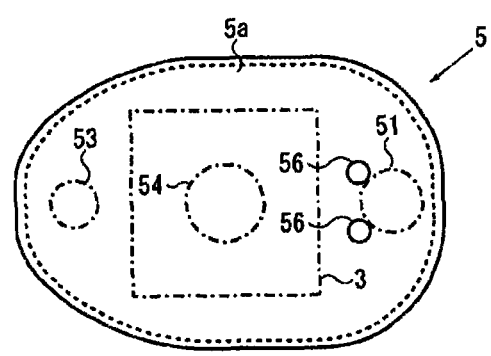
FIG. 5(C)
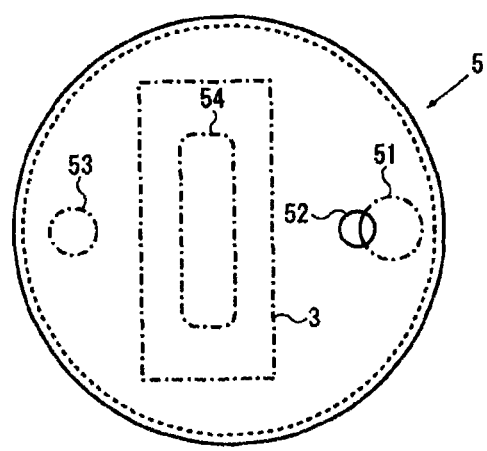

AIRBAG AND AIRBAG DEVICE

CROSS-REFERENCE TO RELATED APPLICATION

This application claims priority under 35 U.S.C. §119 to Japanese Patent Application No. JP2009-291604 filed on Dec. 23, 2009, the entire content of which is hereby incorporated herein by reference in its entirety.

FIELD OF THE INVENTION

The present invention relates to airbags and airbag devices, and, more specifically, it relates to airbags and airbag devices that can support themselves without using the reaction force from windshields.

BACKGROUND OF THE INVENTION

It has become common that vehicles, such as motor vehicles, are provided with airbag devices that inflate and deploy airbags in the vehicles to absorb impact applied on occupants in an emergency, such as a collision or a sudden deceleration. Typically, these airbag devices include an airbag that is normally folded and is inflated and deployed in an emergency, an inflator that supplies gas to the airbag, a retainer that retains the airbag and the inflator, and an airbag cover that covers the airbag.

In a collision or a sudden deceleration of a vehicle, the inflator supplies gas to the airbag to inflate the airbag, causing the airbag cover to tear. Then, the airbag is released in the vehicle and inflated and deployed. In particular, in the case of passenger airbag devices, an airbag is inflated and deployed in a space surrounded by an instrument panel, a windshield (front glass), and an occupant.

For example, airbag devices in which rectification means, such as inner bags or diffusers, is disposed in the airbags have been proposed, as disclosed in Japanese Laid-open Patent Publication Nos. 10-203280 and 2001-233152.

The rectification means disclosed in Japanese Laid-open Patent Publication No. 10-203280 includes an inner bag that is held sandwiched between a windshield (front glass) and an instrument panel. A discharging hole is provided in the inner bag to facilitate vertical deployment of the airbag. Thus, in the airbag device disclosed in Japanese Laid-open Patent Publication No. 10-203280, the inner bag can be fixed between the windshield (front glass) and the instrument panel because of the internal pressure of the inner bag, whereby the flow of gas supplied from the discharging hole can be stabilized to achieve a stable deployment behavior of the airbag.

The rectification means disclosed in Japanese Laid-open Patent Publication No. 2001-233152 includes an inner bag formed in the shape of a small bag that project to the rear of the vehicle within the rear end of the instrument panel. An upper hole and a lower hole are provided in the inner bag. The upper hole is provided at a portion protruding to the rear of the vehicle beyond the terminal end of a split door, and the lower hole is provided at a portion protruding beyond an opening in the instrument panel. Thus, the airbag device disclosed in Japanese Laid-open Patent Publication No. 2001-233152 can reduce the possibility of the inflated inner bag contacting with an occupant approaching the instrument panel, whereby the upper and lower holes are not blocked, and the airbag can be inflated and deployed preferentially in the vertical direction.

SUMMARY OF THE INVENTION

In general, the conventional airbag devices as disclosed in Japanese Laid-open Patent Publication Nos. 10-203280 and 2001-233152 press the airbags against the windshields to stabilize the position and deployment behavior of the airbags using the reaction force therefrom.

Meanwhile, in recent years, various types of vehicles are being developed, and the mounting angles of the windshields vary in the range from 0° to 90° depending on the type of motor vehicle. Therefore, the conditions, such as the installation position and configuration of the airbag device, the size and shape of the airbag, the type of base fabric, the gas pressure and capacity of the inflator, and the presence/absence and structure of the rectification means, are designed for each type of motor vehicle. As a result, there are problems in that it is difficult to reduce the cost of airbag devices and achieve commonality of components. Furthermore, when the airbags are made to be smaller, it is difficult to press the airbags against windshields. Thus, there is a demand for airbags that support themselves without using the reaction force from windshields.

The present invention has been made in view of the above-described problems, and an object thereof is to provide an airbag and an airbag device that can support itself without using the reaction force from a windshield and achieve cost reduction and commonality of components.

The present invention provides an airbag that is normally accommodated in an instrument panel in a folded state and is inflated and deployed between a windshield and an occupant by gas being supplied thereto in an emergency. The airbag includes rectification means that is disposed in the airbag and controls the flow of the gas. The rectification means has a first opening through which the gas is supplied such that part of the airbag on the occupant side is pressed against the instrument panel; a second opening through which the gas is supplied such that the airbag is lifted upward; and a third opening through which the gas is supplied to a base end portion of the airbag on the windshield side.

Furthermore, the present invention provides an airbag device that includes an airbag that is normally folded and is inflated and deployed in an emergency; an inflator that supplies gas to the airbag; a retainer that retains the airbag and the inflator; and an airbag cover that covers the airbag. The airbag is normally accommodated in an instrument panel in a folded state and is inflated and deployed between a windshield and an occupant by gas being supplied thereto in an emergency. The airbag includes rectification means that is disposed therein, which controls the flow of the gas. The rectification means has a first opening through which the gas is supplied such that part of the airbag on the occupant side is pressed against the instrument panel; a second opening through which the gas is supplied such that the airbag is lifted upward; and a third opening through which the gas is supplied to a base end portion of the airbag on the windshield side.

In the airbag and the airbag device, it is preferable that the airbag be inflated and deployed so as not to contact with the windshield.

The third opening may be formed so as to discharge the gas toward a door portion of the instrument panel that is split during inflation and deployment of the airbag. Furthermore, it is preferable that the open areas of the first opening, second opening, and third opening have a relationship of first opening>third opening>second opening.

It is preferable that the rectification means be folded such that the first and third openings are folded inward. Note that the phrase "folded inward" means a state in which the first and third openings are hidden by the folded rectification means.

Furthermore, the rectification means includes, for example, a first base fabric that is inflated and deployed in the airbag and a second base fabric that is fixed to the base end portion of the airbag. The first opening is provided in the second base fabric, the second opening is provided in the first base fabric, and the third opening is provided in the first base fabric or the second base fabric.

Because the above-described airbag and airbag device of the present invention have predetermined rectification means, the airbag can be pressed against the instrument panel to stabilize the position of the airbag, the airbag can be lifted upward so that it is inflated and deployed at a position suitable for restraining an occupant, and gas can be supplied to the base end portion of the airbag on the windshield side to prevent bending of the airbag, whereby the airbag can support itself without using the reaction force from the windshield. Furthermore, by making the airbag support itself, commonality of components of the airbag and the airbag device can be achieved, regardless of the mounting angle of the windshield or the type of motor vehicle. Hence, it is possible to reduce the cost of the airbag and the airbag device.

Furthermore, by preventing the airbag from contacting with the windshield, the airbag can be made to support itself without using the reaction force from the windshield.

Furthermore, by making the gas discharged toward the door portion of the instrument panel that is split during inflation and deployment of the airbag, the gas can be effectively supplied to the base end portion of the airbag on the windshield side. Thus, it is possible to maintain the internal pressure of the airbag at the base portion and to effectively prevent bending of the airbag.

Furthermore, by making the open areas of the first opening, second opening, and third opening in the rectification means have a predetermined relationship, it is possible to effectively distribute gas generated by the inflator to supply it to the airbag.

Furthermore, by folding inward the first and third openings in the rectification means, the gas is not unnecessarily discharged into the airbag during inflation and deployment of the rectification means. Thus, the gas can be efficiently used.

Furthermore, by forming the rectification means from the first and second base fabrics having predetermined openings, the rectification means having the first, second, and third openings can be easily formed only by sewing the outer circumference thereof.

BRIEF DESCRIPTION OF THE DRAWINGS

FIG. 3 includes explanatory diagrams showing the configuration of the rectification means shown in FIG. 1, in which FIG. 3(A) shows a first base fabric, FIG. 3(B) shows a second base fabric, and FIG. 3(C) shows a plan view of a sewn state.

FIG. 4 includes explanatory diagrams showing steps of folding the rectification means shown in FIG. 1, wherein FIG. 4(A) shows a first step, FIG. 4(B) shows a second step, and FIG. 4(C) shows a third step.

FIG. 5 includes diagrams showing a modification of the rectification means shown in FIG. 1, wherein FIG. 5(A) shows a first modification, FIG. 5(B) shows a second modification, and FIG. 5(C) shows a third modification.

DETAILED DESCRIPTION OF THE PREFERRED EMBODIMENTS

Figure 1:
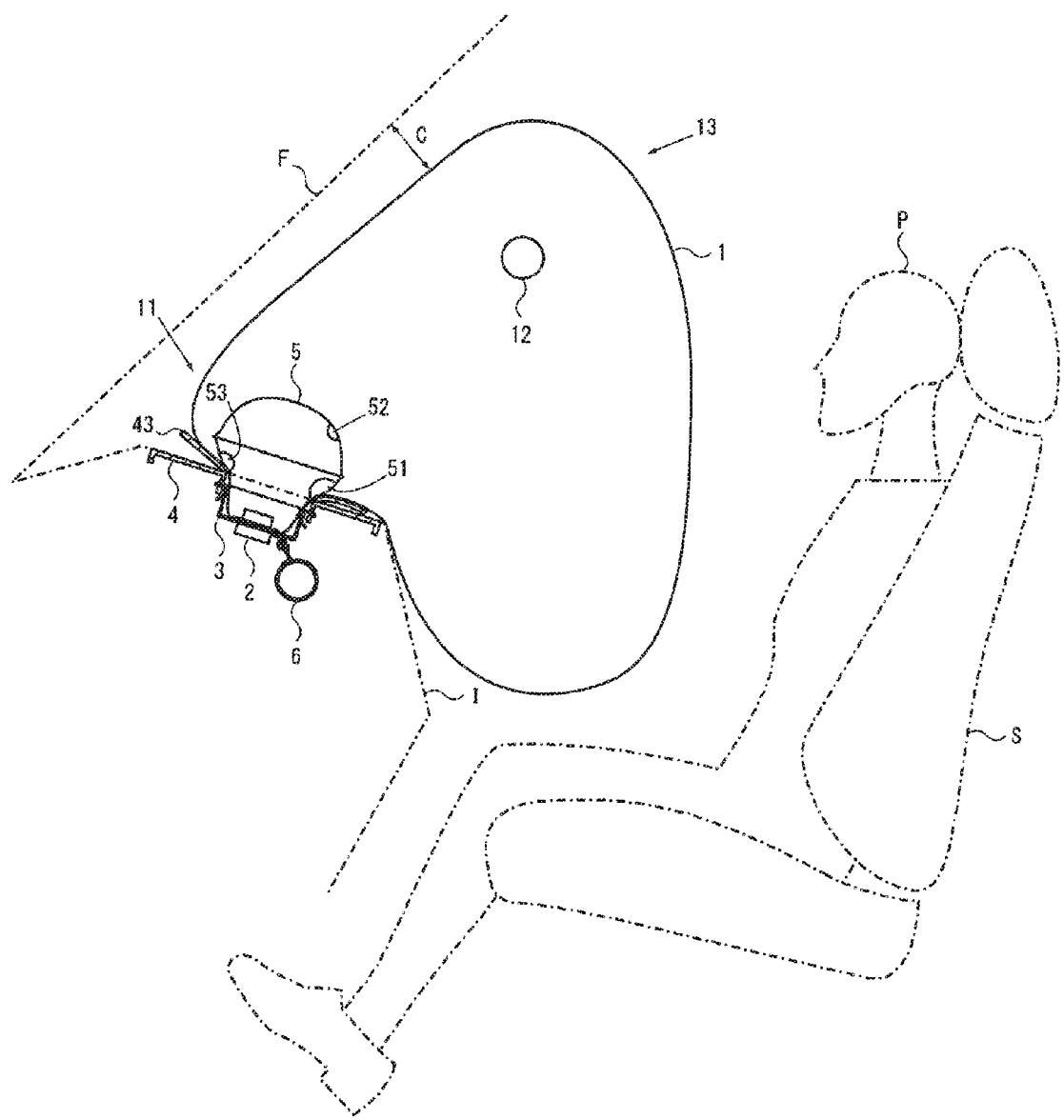
FIG. 1 is a diagram showing the overall configuration of an airbag device according to an embodiment of the present invention.
Figure 2:
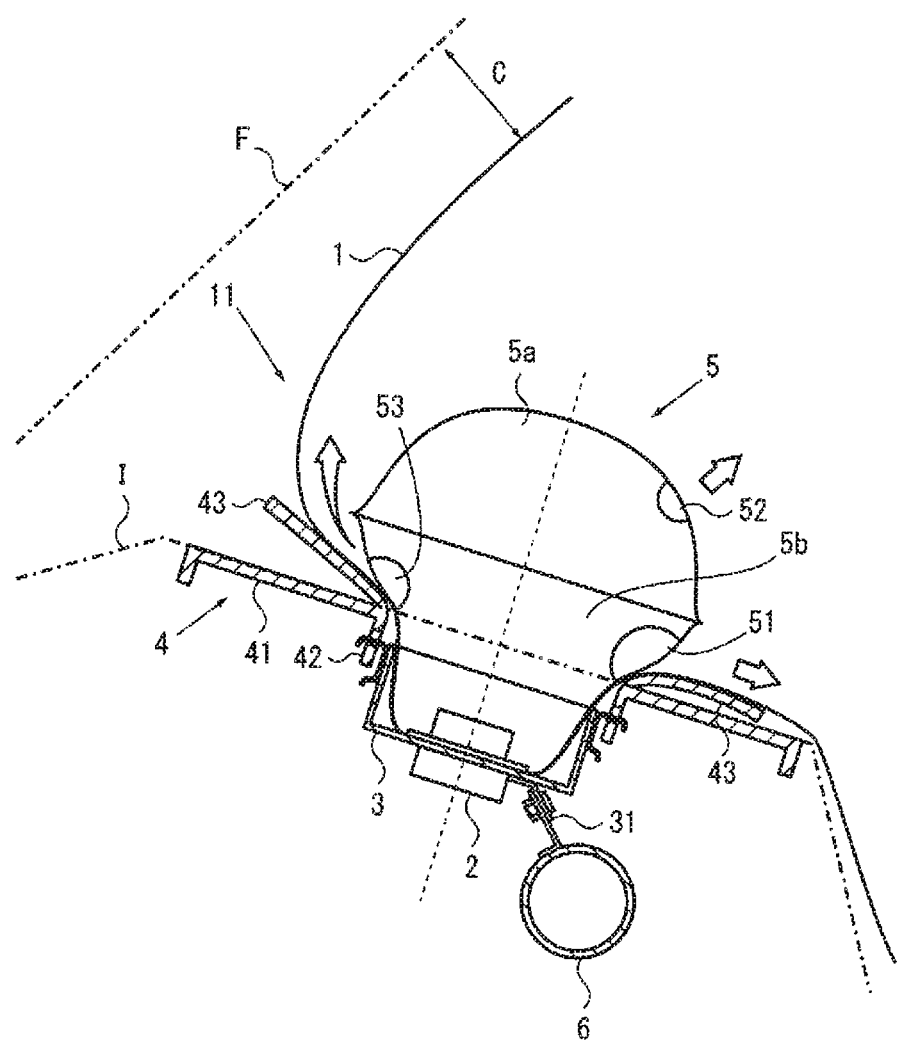
FIG. 2 is an enlarged view of rectification means shown in FIG. 1.

An embodiment of the present invention will be described below using FIGS. 1 to 5. FIG. 1 is a diagram showing the overall configuration of an airbag device according to an embodiment of the present invention. FIG. 2 is an enlarged view of rectification means shown in FIG. 1.

As shown in FIGS. 1 and 2, the airbag device according to an embodiment of the present invention includes an airbag 1 that is normally folded and is inflated and deployed in an emergency, an inflator 2 that supplies gas to the airbag 1, a retainer 3 that retains the airbag 1 and the inflator 2, and an airbag cover 4 that covers the airbag 1. The airbag 1 is normally accommodated in an instrument panel I in a folded state and is inflated and deployed between a front glass F (windshield) and an occupant P by gas being supplied thereto in an emergency. The airbag 1 has rectification means 5 disposed therein, which controls the flow of the gas. The rectification means 5 has a first opening 51 through which gas is supplied such that part of the airbag 1 on the occupant P side is pressed against the instrument panel I, a second opening 52 through which gas is supplied such that the airbag 1 is lifted upward, and a third opening 53 through which the gas is supplied to a base end portion 11 of the airbag 1 on the front glass F side.

The airbag device shown is a so-called passenger airbag device, and the airbag 1 is inflated and deployed in a space surrounded by the occupant P seated in a seat S, the front glass F, and the instrument panel I so as not to touch the front glass F. That is, the airbag 1 according to an embodiment of the present invention is configured such that the airbag 1 after being inflated and deployed has a certain gap C from the front glass F and is configured to be able to support itself without using the reaction force from the front glass F. Note that the airbag 1 has a vent hole 12 that discharges the gas from the airbag 1 when the occupant P contacts with the airbag 1 to absorb the impact.

Furthermore, FIG. 1 shows the airbag 1 in an inflated and deployed state and the surface of the airbag cover 4 constitutes part of the instrument panel I before the airbag 1 is inflated and deployed. The airbag cover 4 includes a plate-like portion 41 that constitutes the interior surface of the vehicle, and an inner case 42 that is disposed behind the plate-like portion 41 and constitutes an inflation and deployment path of the airbag 1. The plate-like portion 41 has door portion 43 formed such that they can be split during inflation and deployment of the airbag 1. Note that the configuration of the airbag cover 4 is not limited to that shown in the drawings, and it is possible to use the configuration appropriately selected from the conventionally used ones.

The inflator 2 has a substantially cylindrical exterior and has gas discharge ports provided in the side-circumferential surface thereof, at a tip portion accommodated in the airbag 1. This inflator 2 is fitted to an opening provided in the retainer 3 and is fixed thereto. Furthermore, the inflator 2 is connected to an ECU (electric control unit) (not shown) and is controlled according to values measured by an acceleration sensor or the like. In an emergency, such as when the ECU detects or predicts a collision or sudden deceleration of the vehicle, an ignition current from the ECU ignites the inflator 2, burning chemical agent contained in the inflator 2 and generating gas, and the gas is supplied to the airbag 1 through the rectification means 5. Note that the shape of the inflator and the method of fixing the inflator are not limited to those shown in the drawings, and it is possible to use those appropriately selected from the conventionally used ones.

The retainer 3 is engaged with an engaging hole provided in the inner case 42 by hooks attached to the side surface thereof and is connected to a fixing member 6 through a connecting member 31. Note that the configurations of the retainer 3, connecting member 31, and fixing member 6 are not limited to those shown in the drawing, and it is possible to use those appropriately selected from the conventionally used ones.

The airbag 1 includes the rectification means 5 having the first opening 51, the second opening 52, and the third opening 53, as described above. The rectification means 5 of this type is sometimes referred to as an inner bag or a diffuser.

As shown in FIG. 2, the rectification means 5 includes a first base fabric 5a that is inflated and deployed in the airbag 1 and a second base fabric 5b that is fixed at the base end portion 11 of the airbag 1. The first opening 51 is provided in the second base fabric 5b, the second opening 52 is provided in the first base fabric 5a, and the third opening 53 is provided in the second base fabric 5b. FIG. 3 includes explanatory diagrams showing the configuration of the rectification means shown in FIG. 1, wherein FIG. 3(A) shows the first base fabric, FIG. 3(B) shows the second base fabric, and FIG. 3(C) shows a plan view of a sewn state.

As shown in FIG. 3(A), the first base fabric 5a has a shape having one sides extending in a direction from the occupant P side to the front glass F side (the front-rear direction of the airbag 1) longer than the other sides perpendicular thereto when deployed flat, and is sewn to the second base fabric 5b along a sewing line L at the outer circumference. The second opening 52 is provided on the occupant P side of the first base fabric 5a. As shown in FIGS. 1 and 2, the second opening 52 provided at this position allows the gas to be discharged substantially along the front glass F, the gas to be supplied so as to lift a head portion 13 of the airbag 1 upward, and the airbag 1 to be inflated and deployed at a position suitable for restraining the occupant P, when the rectification means 5 is inflated and deployed.

As shown in FIG. 3(B), the second base fabric 5b is larger than the retainer 3 and has a shape having one sides extending in the direction from the occupant P side to the front glass F side (the front-rear direction of the airbag 1) longer than the other sides perpendicular thereto when deployed flat. This is because the rectification means 5 supplies the gas only in the front-rear direction of the airbag 1, and hence, there is no need to provide an opening in the left-right direction of the airbag 1. Of course, an opening may be provided in the left-right direction of the airbag 1 as needed. The first opening 51 is provided on the occupant side of the second base fabric 5b, and the third opening 53 is provided on the front glass side of the second base fabric 5b.

As shown in FIGS. 1 and 2, the first opening 51 provided at this position allows the gas to be discharged toward or along the door portion 43 having been split and rotated toward the occupant P, the gas to be supplied so as to press the airbag 1 against the instrument panel I, and the position of the airbag 1 to be stabilized, when the rectification means 5 is inflated and deployed. Furthermore, as shown in FIGS. 1 and 2, the third opening 53 provided at this position allows the gas to be discharged toward the door portion 43 having been split and rotated toward the front glass F, the gas to be supplied to the base end portion 11 at the front glass F of the airbag 1, and the airbag 1 to be prevented from bending, when the rectification means 5 is inflated and deployed, i.e., when the airbag 1 is inflated and deployed.

Note that the second base fabric 5b has, at substantially the central portion thereof, an inflator opening 54 into which the inflator 2 is inserted and a plurality of insertion holes 55 disposed around the inflator opening 54, into which pins for fixing the inflator 2 are inserted.

As shown in FIG. 3(C), a bag (rectification means 5) having the first opening 51, the second opening 52, and the third opening 53 is formed by overlapping the first base fabric 5a and the second base fabric 5b and sewing them along the sewing line L. Furthermore, the first opening 51, the second opening 52, and the third opening 53 are formed such that the open areas of the openings have a relationship of the first opening 51>the third opening 53>the second opening 52. By setting the open areas of the openings as above, it is possible to effectively press the airbag 1 against the instrument panel I, to effectively prevent bending of the airbag 1, and to effectively lift the airbag 1 upward.

In particular, because the airbag 1 according to an embodiment of the present invention is inflated and deployed to a large size toward the occupant P, as shown in FIG. 1, the base end portion 11 at the base portion of the airbag 1 tends to bend due to its weight. However, because the internal pressure of the base portion of the airbag 1 can be maintained substantially constant by supplying a large amount of gas to the base end portion 11 at the front glass F of the airbag 1 with the above-described rectification means 5, the airbag 1 can be prevented from bending. Furthermore, by providing the third opening 53 at a position overlapping the door portion 43 of the instrument panel I having been split during inflation and deployment of the airbag 1 to discharge the gas toward the door portion 43, the gas from the inflator 2 can be effectively distributed to the base portion of the airbag 1 on the front glass F side.

Furthermore, as shown in FIGS. 1 and 2, the airbag 1 having the above-described rectification means 5 is inflated and deployed so as not to touch the front glass F. In other words, the airbag 1 is configured such that it has a certain gap C from the front glass F after being inflated and deployed. Therefore, the airbag 1 is configured to be able to support itself without using the reaction force from the front glass F. Note that the gap C between the airbag 1 and the front glass F is not a necessary component in the present invention. The present invention may include a case where the reaction force from the front glass F is small and does not contribute to self-supporting of the airbag 1, even though the airbag 1 is in contact with the front glass F.

Next, a method of folding the rectification means 5 will be described. FIG. 4 includes explanatory diagrams showing steps of folding the rectification means 5 shown in FIG. 1, wherein FIG. 4(A) shows a first step, FIG. 4(B) shows a second step, and FIG. 4(C) shows a third step. Note that the airbag 1 is not illustrated in the respective drawings for the ease of description.

The first step shown in FIG. 4(A) is a step of deploying the rectification means 5 flat on the retainer 3 with the inflator 2 connected to the inflator opening 54 in the rectification means 5. At this time, the rectification means 5 extends beyond the edges of the retainer 3 in the left-right direction (the portions outside the long dashed double-short dashed line).

The second step shown in FIG. 4(B) is a step of folding inward the portions of the rectification means 5 extending beyond the edges of the retainer 3 in the left-right direction. As shown in the drawing, the portions of the rectification means 5 extending beyond the edges of the retainer 3 in the left-right direction are folded inward to a size capable of being accommodated in the retainer 3 in, for example, peak and valley folds. Note that the portions extending beyond the edges of the retainer 3 may be folded using other folding methods, such as accordion folds, inside folds, and roll folds, instead of peak and valley folds. At this time, the rectification means 5 also extends beyond the edges of the retainer 3 in the front-rear direction.

The third step shown in FIG. 4(C) is a step of folding inward the portions of the rectification means 5 extending beyond the edges of the retainer 3 in the front-rear direction.

As shown in the drawing, the portions of the rectification means 5 extending beyond the edges of the retainer 3 in the front-rear direction are folded inward to a size capable of being accommodated in the retainer 3 in, for example, roll folds. At this time, the rectification means 5 is folded such that the first opening 51 and the third opening 53 are rolled inward. Thus, by folding the rectification means 5 such that the first opening 51 and the third opening 53 are hidden, it is possible to make the gas less likely to be unnecessarily discharged into the airbag 1 through the first opening 51 and the third opening 53 during inflation and deployment of the rectification means 5, to efficiently use the gas, and to quickly inflate and deploy the rectification means 5.

In fact, although the airbag 1 is not illustrated in FIGS. 4(A) to 4(C), the rectification means 5 is deployed flat on the retainer 3 together with the airbag 1, the portions extending beyond the edges of the retainer 3 in the left-right direction are folded together with the airbag 1, and finally, the portions extending beyond the edges of the retainer 3 in the front-rear direction are folded together with the airbag 1. Note that portion of the airbag 1 not overlapping the rectification means 5 when deployed flat is folded in, for example, peak and valley folds, accordion folds, inside folds, roll folds, or an arbitrary folding method that is any combination of the above.

Finally, a modification of the rectification means 5 will be described. FIG. 5 includes diagrams showing a modification of the rectification means 5 shown in FIG. 1, wherein FIG. 5(A) shows a first modification, FIG. 5(B) shows a second modification, and FIG. 5(C) shows a third modification. Note that, in the respective drawings, portions that are the same as those of the rectification means 5 shown in FIG. 1 are denoted by the same reference numerals, and overlapping descriptions will be omitted.

In the first modification shown in FIG. 5(A), the third opening 53 is provided in the first base fabric 5a of the rectification means 5. Even when the third opening 53 is provided at this position, the gas can be effectively supplied to the base end portion 11 of the airbag 1, and the internal pressure at the base portion of the airbag 1 can be maintained substantially constant. Note that, as long as the third opening 53 can supply gas to the base end portion 11 of the airbag 1, the third opening 53 may be provided at a position beyond the door portion 43 of the instrument panel I having been split during inflation and deployment of the airbag 1, from where it discharges the gas to the base portion of the airbag 1.

In the second modification shown in FIG. 5(B), the second opening 52 is formed of a plurality of small holes 56. At this time, the open area of the small holes 56 is preferably the same as the open area of the second opening 52 shown in FIG. 1. Thus, by forming the second opening 52 of a plurality of small holes 56 to disperse the holes, it is possible to prevent the first opening 51 and the second opening 52 from being connected as a tube and allowing the gas to be unnecessarily discharged therethrough during inflation and deployment of the rectification means 5. Thus, it is possible to effectively inflate and deploy the rectification means 5. Note that the number of small holes 56 is not limited to two, but may be three or more.

In the third modification shown in FIG. 5(C), the first base fabric 5a and the second base fabric 5b of the rectification means 5 are formed in a substantially circular shape. This third modification may be used when, for example, the space for accommodating the airbag 1 is long in the left-right direction, that is, when the retainer 3 is long in the left-right direction. Thus, the shape of the base fabric constituting the rectification means 5 can be appropriately changed according to the shape of the space for accommodating the airbag 1.

Although not shown, the base fabrics constituting the rectification means 5 are not limited to the combination of the first base fabric 5a and the second base fabric 5b shown in FIG. 3, and one of the first base fabric 5a and the second base fabric 5b may be formed larger than the other. Furthermore, the rectification means 5 may be formed of one base fabric formed in a three-dimensional bag-like shape, or may be formed of a base fabric divided into three or more pieces and sewn together.

Although the description has been given taking the passenger airbag device as an example of the airbag device according to an embodiment of the present invention, the present invention may be applied to an airbag device that inflates and deploys the airbag 1 using the reaction force from the windshields (including the front glass F and the rear glass), such as an airbag device for the driver's seat or an airbag device for the rear seat.

The present invention is not limited to the above-described embodiment, and it may of course be variously modified within the scope not departing from the spirit of the present invention. For example, the rectification means 5 according to the first through the third modifications may be used in an appropriate combination.

What is claimed is:

1. An airbag that is normally accommodated in an instrument panel in a folded state and is inflated and deployed between a windshield and an occupant by gas being supplied thereto in an emergency, the airbag comprising:
   rectification means that is disposed in the airbag and controls the flow of the gas;
   wherein the rectification means comprises:
   a first opening at a lower, rearward portion of the rectification means through which the gas is supplied generally in a first direction such that part of the airbag at the occupant side is pressed against the instrument panel;
   a second opening at an upper, rearward portion of the rectification means through which the gas is supplied generally in a second direction such that the airbag is lifted upward; and
   a third opening at a lower, forward portion of the rectification means through which the gas is supplied generally in a third direction to a base end portion of the airbag at the windshield side located in front of the airbag,
   wherein the first, second and third directions are different from each other and arranged such that the airbag is inflated and deployed at a position suitable for restraining the occupant by the gas supplied from the second opening; the position of the airbag is stabilized by the gas supplied from the first opening; and the airbag is kept from bending by the gas supplied from the third opening to allow the airbag to be self-supporting when inflated and deployed without using a reaction force from the windshield.

2. The airbag according to claim 1,
   wherein the airbag is inflated and deployed so as not to contact with the windshield.

3. The airbag according to claim 1,
   wherein the third opening is formed so as to discharge the gas toward a door portion of the instrument panel that is split during inflation and deployment of the airbag.

4. The airbag according to claim 1,
   wherein the open areas of the first opening, second opening, and third opening have a relationship of first opening>third opening>second opening.

5. The airbag according to claim 1,
   wherein the rectification means is folded such that the first and third openings are folded inward.

6. The airbag according to claim 1,
wherein the rectification means includes a first base fabric that is inflated and deployed in the airbag and a second base fabric that is fixed to the base end portion of the airbag,
wherein the first opening is provided in the second base fabric, the second opening is provided in the first base fabric, and the third opening is provided in the first base fabric or the second base fabric.

7. An airbag device comprising:
an airbag that is normally folded and is inflated and deployed in an emergency;
an inflator that supplies gas to the airbag;
a retainer that retains the airbag and the inflator; and
an airbag cover that covers the airbag,
wherein the airbag is the airbag according to any one of claims 1 to 6.

* * * * *